(12) United States Patent
Kamble et al.

(10) Patent No.: US 8,711,723 B2
(45) Date of Patent: Apr. 29, 2014

(54) SUBBAND SNR CORRECTION IN A FREQUENCY SELECTIVE SCHEDULER

(75) Inventors: Vihang Gangaram Kamble, Bangalore (IN); Manjari Chhawchharia, Bangalore (IN); Suresh Kalyanasundaram, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 226 days.

(21) Appl. No.: 13/286,693

(22) Filed: Nov. 1, 2011

(65) Prior Publication Data

US 2012/0163208 A1      Jun. 28, 2012

(30) Foreign Application Priority Data

Dec. 28, 2010   (IN) ............................ 1461/KOL/2010

(51) Int. Cl.
  *H04L 12/26*   (2006.01)
  *H04L 12/28*   (2006.01)
  *H04L 12/56*   (2011.01)
  *H04W 4/00*   (2009.01)

(52) U.S. Cl.
  USPC .... 370/252; 370/329; 370/395.2; 370/395.41

(58) Field of Classification Search
  USPC ............ 370/252, 329, 332, 333, 395.4–395.5
  See application file for complete search history.

(56) References Cited

U.S. PATENT DOCUMENTS

| 8,358,585 | B2 * | 1/2013 | Chung et al. ................. 370/252 |
| 8,457,235 | B2 * | 6/2013 | Ko et al. ........................ 375/267 |
| 2009/0219870 | A1 | 9/2009 | Wengerter et al. |
| 2010/0254272 | A1 * | 10/2010 | Chun et al. ..................... 370/252 |
| 2010/0271970 | A1 * | 10/2010 | Pan et al. ....................... 370/252 |

FOREIGN PATENT DOCUMENTS

| EP | 2015595 A1 | 1/2009 |
| WO | 2009082110 A3 | 7/2009 |

* cited by examiner

*Primary Examiner* — Xavier Szewai Wong (57) ABSTRACT

A method, system, and base station for providing subband signal to noise ratio (SNR) correction in the scheduling of communication resources. A Scheduling Correction (SC) utility receives periodic subband and wideband channel quality indicator (CQI) reports from one or more wireless devices. The SC utility records a subframe report period for a respective subband CQI report. The SC utility calculates the age of the subband report to determine whether the subband CQI report remains valid. If the subband report is invalid, the SC utility utilizes the wideband CQI report for (current) transmission scheduling. However, if the subband report is valid, the SC utility utilizes: (a) the subband CQI report for transmission scheduling from the most current reporting subframe; or (b) a modified subband CQI value with a correction that utilizes the wideband CQI report, if the subband CQI report was not received at the most current reporting subframe.

14 Claims, 7 Drawing Sheets

SUBBAND SNR CORRECTION IN A FREQUENCY SELECTIVE SCHEDULER

BACKGROUND

1. Technical Field

The present invention generally relates to wireless communication systems and in particular to transmission scheduling in wireless communication systems.

2. Description of the Related Art

In wireless communication systems employing packet-scheduling, part of the air-interface resources are assigned dynamically to different mobile stations (MS). In an orthogonal frequency division multiple access (OFDMA) system, these dynamically allocated resources, which comprise multiple subcarriers (subbands), are dynamically shared between multiple MSs. According to the Long Term Evolution (LTE) standard, the user equipment (UE) is configured to report Channel Quality Indicators (CQIs) to assist the Evolved Node B (eNodeB) in selecting an appropriate modulation code scheme (MCS) to use for downlink transmissions. CQI information is reported from user equipment to a base station so that the base station can perform an appropriate scheduling of radio resources in consideration of the channel quality indicator in a downlink shared data channel. The CQI reports are derived from the downlink received signal quality, typically based on measurements of the downlink reference signals. In LTE, physical uplink control channel (PUCCH), which carries control information via uplink transmission towards the evolved Node B (eNodeB), is used for reporting the CQI information.

In current frequency selective scheduling (FSS) techniques for LTE, subband CQI reports are being used by the FSS in deciding user equipment-physical resource block (UE-PRB) combinations. However, because of the reporting mechanism used, each subband does not report a subband CQI value at each reporting sub-frame. Furthermore, a subband CQI value for one or more subbands may not be reported for several consecutive reporting sub-frames. As a result, inaccuracies in subband CQIs due to old/"stale" subband CQI values/reports may result in poor scheduler performance.

BRIEF DESCRIPTION OF THE DRAWINGS

The following detailed description of an illustrative embodiment are to be read in conjunction with the accompanying drawings, wherein.

DETAILED DESCRIPTION OF AN ILLUSTRATIVE EMBODIMENT

The illustrative embodiments provide a method, system, and base station for providing subband signal to noise ratio (SNR) correction in the scheduling of communication resources. A Scheduling Correction (SC) utility executing at the base station receives periodic subband and wideband channel quality indicator (CQI) reports from one or more wireless devices. The SC utility records a subframe reporting period for a respective subband CQI report. The SC utility calculates the age of the subband report to determine whether the subband CQI report remains valid (i.e., whether the report age exceeds the threshold age). If the subband report is invalid, the SC utility utilizes the wideband CQI report for (current) transmission scheduling. However, if the subband CQI report is valid, the SC utility: (a) utilizes the subband CQI report for transmission scheduling from the most current reporting subframe or (b) utilizes a modified subband CQI value with a correction that utilizes the wideband CQI report, when the subband CQI report was not received at the most current reporting subframe.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
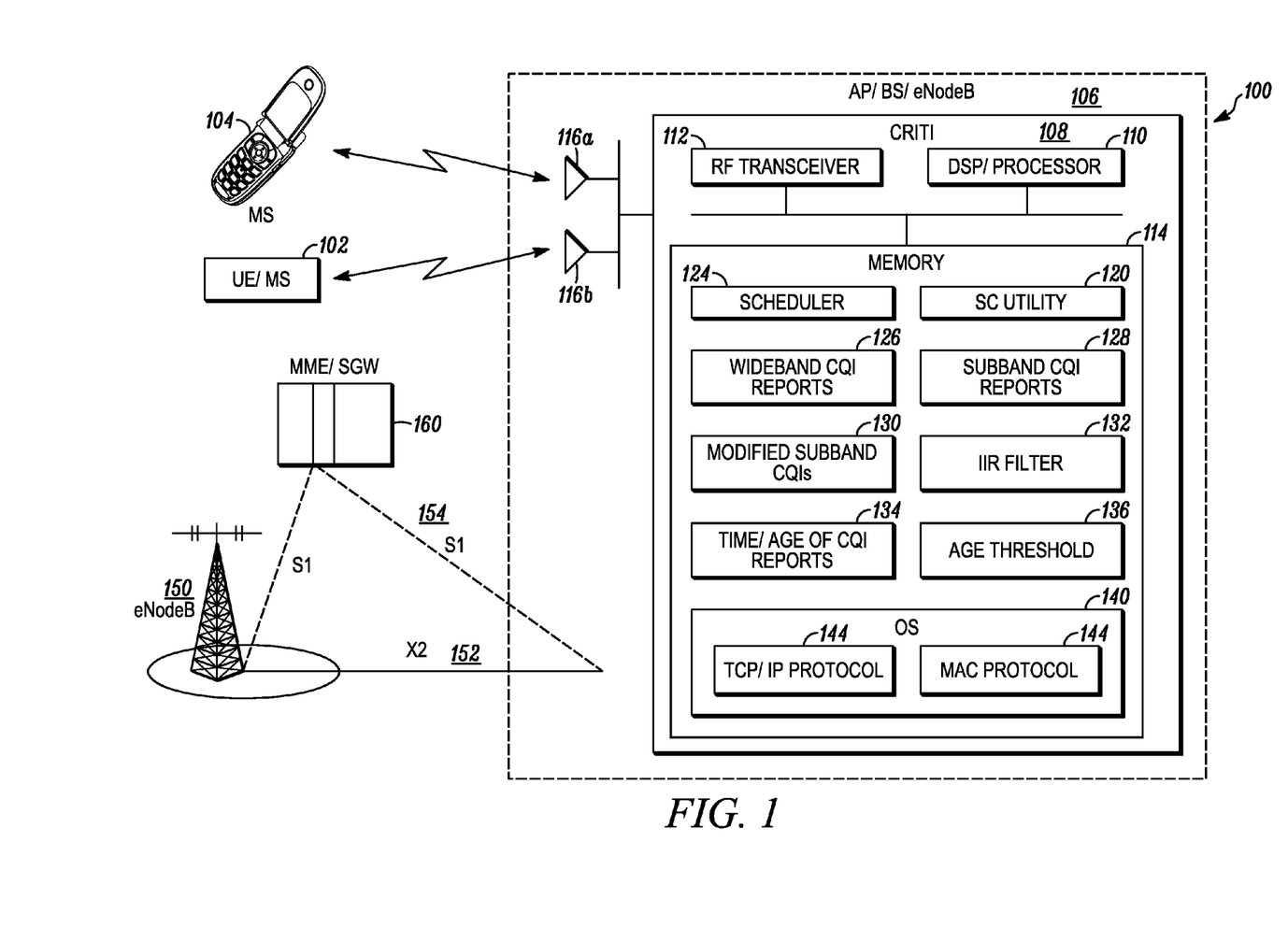
FIG. 1 illustrates a Long Term Evolution (LTE) configured wireless communication system including a block diagram representation of a base-station (BS)/eNodeB, according to one embodiment.

With reference now to FIG. 1, a Long Term Evolution (LTE) configured wireless communication system is illustrated, according to one embodiment. In the described embodiments, wireless communication system 100 may support several standards/networks, such as third generation (3G) and fourth generation (4G) networks, which include Long Term Evolution (LTE) standard.

Wireless communication system 100 comprises a number ("L") of wireless communication devices, for example, first and second wireless devices, mobile station (MS)/user equipment (UE) 102 and MS/UE 104. One or more of the wireless communication devices may be associated with a mobile user/subscriber. Thus, in certain instances, a wireless communication device may be interchangeably referred to herein as a user device, user equipment (UE), mobile user device, mobile station (MS), subscriber or user, as a general reference to the association of the device(s) to a device user. These references are however not intended to be limiting on the applicability of the invention to devices not directly associated with individual/human users. Within the description which follows, the example wireless device is primarily referred to as MS/UE 102 or simply UE 102.

Wireless communication system 100 comprises at least one base-station (BS)/Evolved Universal Terrestrial Radio Access Network Node B (eNodeB/eNB) 106, illustrated with its various functional components in block diagram representation. In one embodiment, BS/eNodeB 106 may represent a base transceiver station (BTS), an enhanced/evolved node B (enodeB), or a base station. BS/enodeB 106 comprises Controller 108. Controller 108 comprises memory 114, digital signal processor (DSP)/Processor 110 and RF transceiver 112. Although the logic of RF transceiver 112 is illustrated within controller 108, it should be appreciated that with other implementations, RF transceiver 112 may likely be positioned external to controller 108. Also, while shown as a single module/device, DSP/Processor 110 may be one or more individual components communicatively coupled to each other, and controlling different functions within Controller 108. The wireless communication devices all connect to BS/eNodeB 106 via an antenna array comprising one or more antenna elements, of which BS antenna array 116 (i.e., comprising antenna 116a and antenna 116b) is illustrated.

Wireless communication system 100 is further illustrated with second BS/eNodeB 150. BS/eNodeB 106 and second BS/eNodeB 150 are interconnected by means of an X2 interface (e.g., X2 152). Furthermore, BS/eNodeB 106 and second BS/eNodeB 150 are connected by means of an S1 interface (e.g., S1 154) to an evolved packet core (EPC), more specifically, to mobility management entity (MME)/serving gateway (S-GW) 160.

In addition to the above described hardware components of BS/eNodeB 106 within wireless system 100, various features of the invention may be completed/supported via software (or firmware) code or logic stored within memory 114 or other storage and executed by DSP/Processor 110. Thus, for example, illustrated within memory 114 are a number of software/firmware/logic/data components or modules, including operating system (OS) 140 which includes Transmission Control Protocol (TCP)/Internet Protocol (IP) module 142 and Media Access Control (MAC) protocol module 144. Memory 114 also includes scheduler 124, wideband CQI reports/values 126, subband CQI reports/values 128 and modified subband CQI values 130. Also included within memory 114 are infinite impulse response (IIR) filter (coefficients/parameters) 132, time/age of subband CQI reports/files 134 and CQI threshold age values 136. In addition, memory 114 comprises scheduling correction (SC) logic/utility 120. In actual implementation, SC utility 120 may be combined with or incorporated into scheduler 124 as well as with one or more of the other components/modules to provide a single executable component, collectively providing the various functions of each individual component when the corresponding combined component is executed by processing components of BS/eNodeB 106. For simplicity, SC utility 120 is illustrated and described as a stand-alone or separate software/firmware component, which provides specific functions, as described below. In the described embodiment, SC utility 120 provides certain functions that are executed by components within communication architecture/system 100, specifically UE 102 and/or eNodeB 106. Additional detail of the functionality associated with SC logic/utility 120 is presented below with reference to FIG. 2 and subsequent figures.

During wireless communication, MS/UE 102 and MS/UE 104 wirelessly communicates with BS/eNodeB 106 via the antenna array. As one wireless device, e.g., MS/UE 102, receives data from another electronic device (e.g., MS/UE 104), BS/eNodeB 106 schedules, via frequency selective scheduler (FSS) 124, downlink communication of data between BS/ENodeB 106 and MS/UE 102. Furthermore, FSS 124 schedules both the uplink and downlink TCP data transmission corresponding to wireless devices, MS/UE 102 and MS/UE 104.

Figure 2:
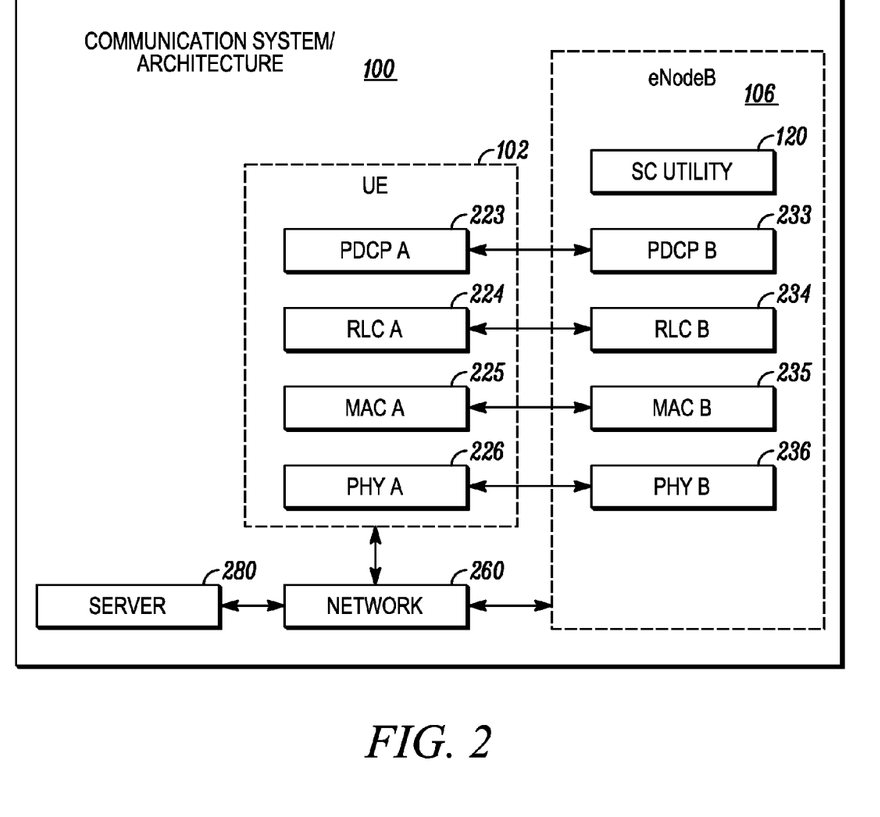
FIG. 2 provides a block diagram representation of a communication architecture for communication between user equipment (UE) and Evolved Universal Terrestrial Radio Access Network Node B (eNodeB), according to one embodiment.

With reference now to FIG. 2, there is depicted a block diagram representation of an LTE communication architecture for communication between user equipment (UE) and eNB. As illustrated, communication architecture 100 comprises UE 102 and eNodeB 106. UE 102 comprises packet data convergence protocol (PDCP) A 223, radio link control (RLC) A 224, medium access control (MAC) A 225, and physical layer (PHY) A 226. In communication with UE 102 is eNodeB 106. Included within eNodeB 106 are: scheduling correction (SC) utility 120, packet data convergence protocol (PDCP) B 233, radio link control (RLC) B 234, medium access control (MAC) B 235, and physical layer (PHY) B 236. Additionally, communication system/architecture 100 includes network 260 and server 280.

In one embodiment, eNodeB 106 transmits and receives data and/or information from UE 102. PDCP A 223, RLC A 224, MAC A 225, and PHY A 226 of UE 102 enable UE 102 to communicate (e.g., configuration data) via respective connections/layers with eNodeB 106, which similarly comprises PDCP B 233, RLC B 234, MAC B 235, and PHY B 236. Network 260 also receives and transmits data to and from UE 102 and eNodeB 106. Network 260 may send and receive data/information from one or more components (not shown) via server 280. Server 280 represents a software deploying server and communicates with eNodeB 106 via network 260. SC utility 120 may be deployed from/on the network, via server 280. With this configuration, the software deploying server performs one or more functions associated with the execution of SC utility 120.

Those of ordinary skill in the art will appreciate that the hardware components and basic configuration depicted in FIG. 1 and FIG. 2 may vary. The illustrative components within wireless communication system/architecture 100 and BS/eNodeB 106 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Certain of the functions supported and/or provided by SC utility 120 are implemented as processing code executed by processor 110 and/or other device hardware to complete those function(s). Among the software code/instructions/logic provided by SC utility 120, and which are specific to the invention, are: (a) logic for receiving periodic subband and wideband channel quality indicator (CQI) reports from one or more wireless devices; (b) logic for calculating the age of the subband CQI report, according to the reporting sub-frame; (c) logic for determining whether the report's age exceeds a preconfigured/preset threshold age; and (d) logic for, when the report's age exceeds the threshold age, utilizing the wideband CQI value/report for (current) transmission scheduling; (e) logic for, when the report's age does not exceed the threshold age, utilizing (i) the subband CQI report if the report is received via the most current (i.e., the most recent) reporting subframe or (ii) a modified subband CQI value with a filter correction that utilizes the wideband CQI report, if the subband CQI report is not received via the most current reporting subframe. According to the illustrative embodiment, when processor 110 executes SC utility 120, BS/eNodeB 106 initiates a series of functional processes that enable the above functional features as well as additional features/functionality. These features/functionalities are described in further detail below within the (continuing description of FIGS. 1-2 and) description of FIGS. 3-6.

In wireless communication system 100 (or BS/eNodeB 106), SC utility 120 periodically receives subband CQI reports from one or more mobile devices. The LTE system allows several reporting options for both wideband (i.e., over the system bandwidth) and subband (narrower than the system bandwidth) CQI, with the latter allowing exploitation of frequency selective fading. According to the LTE standard, PUCCH carries control information via uplink transmission towards the eNodeB. In response to receipt of a subband CQI report, SC utility 120 records the subframe reporting period for the respective subband CQI report. At less frequent intervals/periods, SC utility 120 also receives wideband CQI reports from wireless devices. In order to initiate downlink transmission to one or more wireless/"mobile" devices 102, 104, SC utility 120 initiates a process to dynamically determine which one of the subband CQI report and the wideband CQI report provides a best throughput performance for scheduling a current downlink transmission. SC utility 120 retrieves CQI reports that correspond to the one or more mobile devices. In addition, SC 120 retrieves the corresponding subframe report period and generates the current age of the report based on the elapsed time between the relevant subframe report period and the report period of the most current subframe.

SC utility 120 compares the current age with a threshold age to determine whether the corresponding report is still useful and has not yet expired. If SC utility 120 determines that the current age exceeds the threshold age, SC utility 120 instead retrieves and utilizes a wideband CQI report in order to schedule transmissions to achieve the best throughput. However, if SC utility 120 determines that the subband report is still valid, SC utility 120 utilizes, for current transmission scheduling, the subband CQI report if the report was received at the most current reporting subframe and alternatively utilizes a modified/computed/corrected subband CQI report via a IIR filter that utilizes the wideband CQI report value and a previous subband CQI value, if the subband CQI report is received at the most current reporting subframe (i.e., the reporting subframe that last provided a subband CQI value, which reporting subframe precedes a current transmission scheduling period and which subband CQI value (last provided) is applied to current downlink transmission scheduling).

Figure 3A:
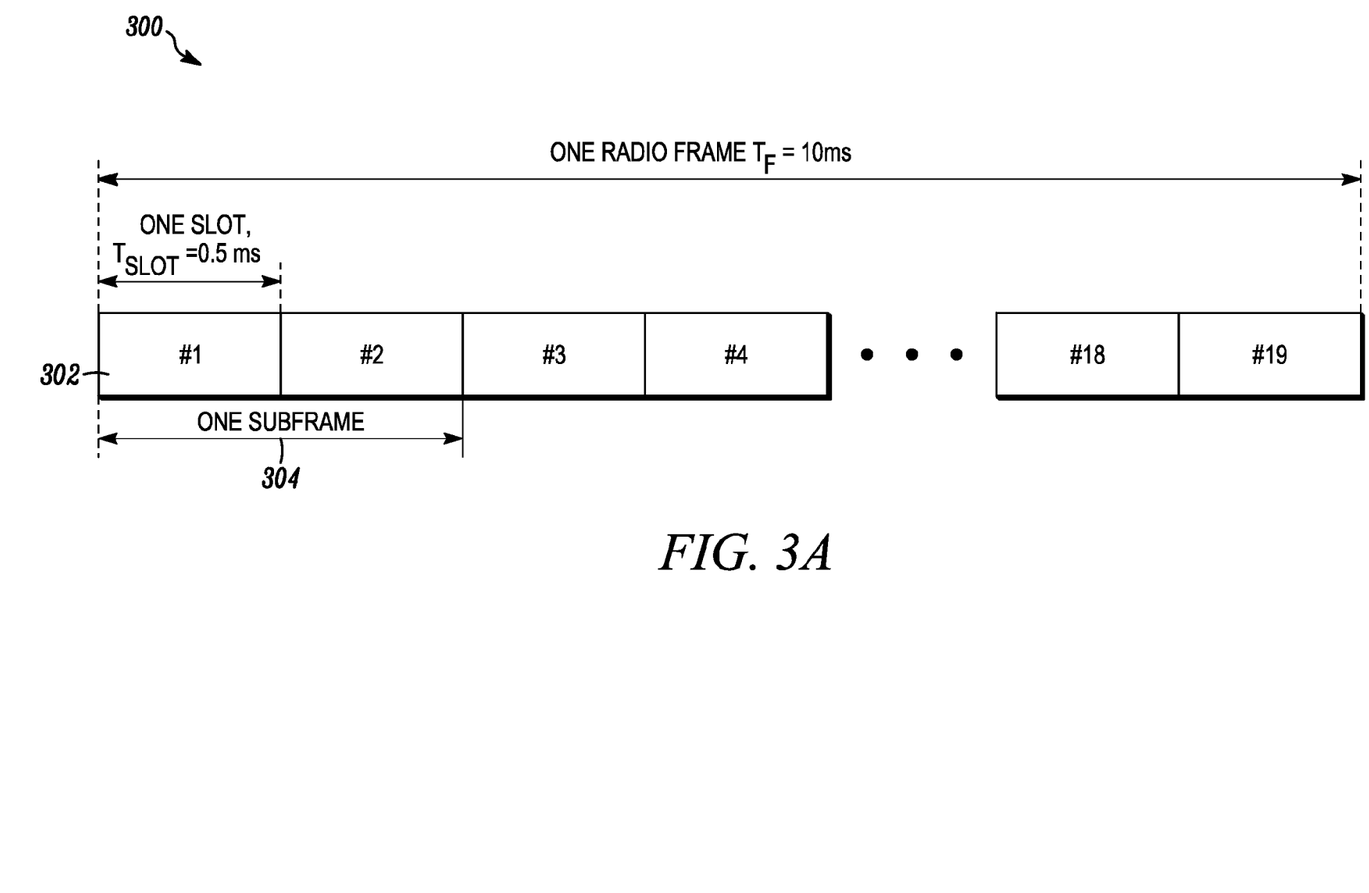
FIG. 3A illustrates the structure of a single radio frame, according to one embodiment.

FIG. 3A illustrates the structure of a single radio frame, according to one embodiment of the invention. Radio frame 300 illustrates the organization of communication resources within the time domain. LTE transmissions are organized into radio frames, for example, radio frame 300. Radio frame 300 may be divided into slots (e.g., slot 302) each of which has time duration of 0.5 ms. One sub-frame (e.g., sub-frame 304) consists of 2 equally-sized time slots and has a duration of 1 ms. One radio frame (e.g., radio frame 300) consists of 10 sub-frames and thus spans for 10 ms (i.e., 10*2*0.5 ms). The minimum time resource allocation is one time slot for uplink or downlink is one time slot.

Figure 3B:
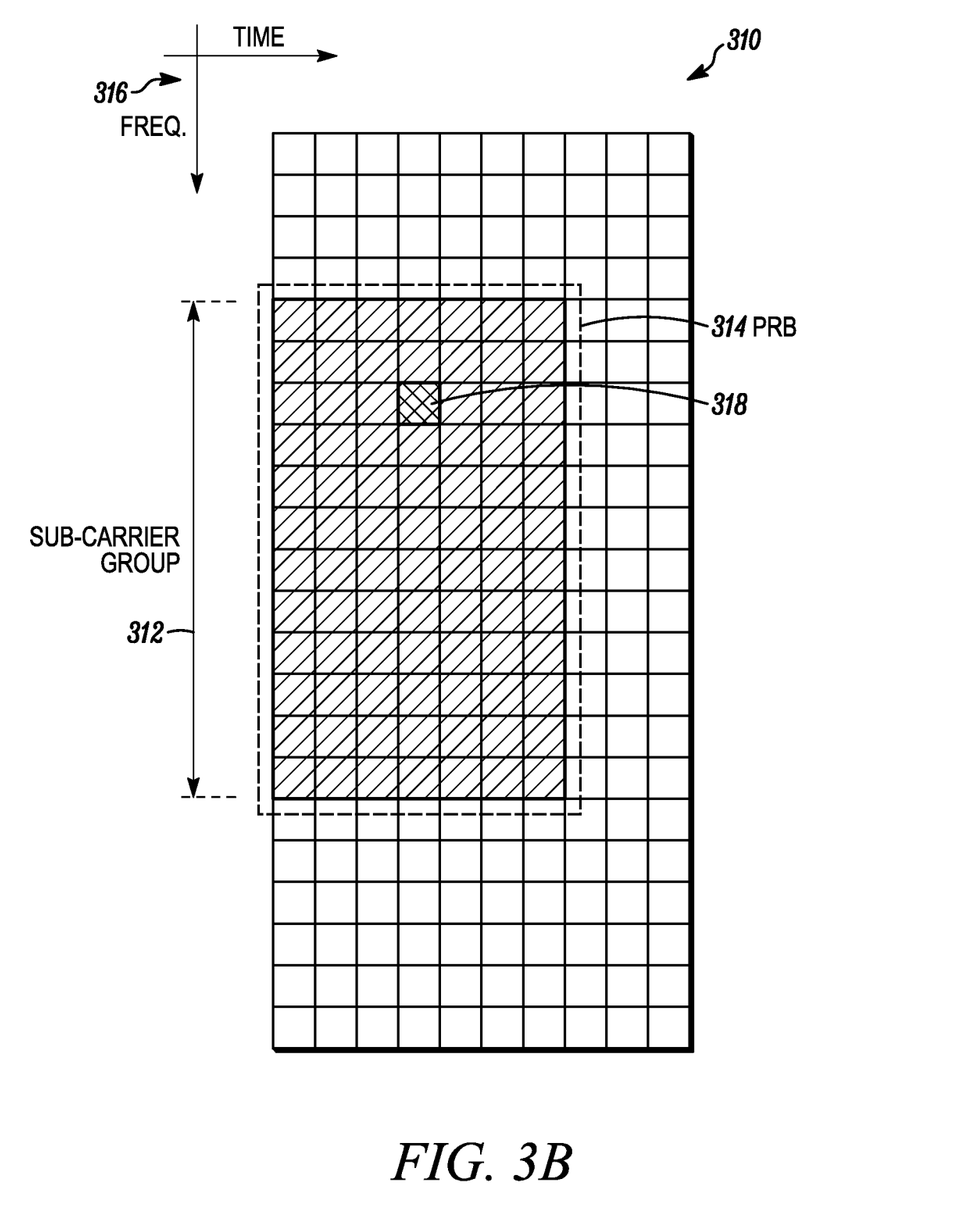
FIG. 3B illustrates the physical layer resource structure for Long Term Evolution (LTE), according to one embodiment.

FIG. 3B illustrates the physical layer resource structure for LTE, according to one embodiment. Resource grid 310 illustrates a segment of a subband (i.e., a subband which comprises four (4) physical resource blocks (PRBs)). Within the illustrated subband segment of resource grid 310, PRB 314 is a specifically highlighted example PRB. PRB 314 is composed of multiple elemental blocks of which resource element 318 is an example. Sub-carrier group 312 consists of twelve (12) sub-carriers and represents the sub-carrier allocation for PRB 314. Also illustrated in resource grid 310 is time-frequency axis 316. The LTE physical resource may be represented by a frequency-time grid (e.g., resource grid 310) where a single resource element (e.g., resource element 318) corresponds to one orthogonal frequency-division multiplexing (OFDM) subcarrier during one OFDM symbol interval with carrier spacing of 15 KHz.

The complete subband (which is not explicitly shown in resource grid 310) comprises 4 PRBs (including, for example, PRB 314) stacked vertically, along the frequency axis for the 5 MHz LTE system. Thus, the complete subband comprises 48 subcarriers (i.e., 12 subcarriers per PRB). In one embodiment, a subband may comprise blocks of adjacent and consecutive PRBs, according to indexing of axis 316. Furthermore, a pair of wireless devices may be assigned different PRBs in the same subband.

The minimum sized radio resource block that may be allocated on both uplink and downlink is called a PRB, and contains 12 sub-carriers transmitted in one time slot (0.5 ms), e.g., slot 302. Thus, the minimum allowable spectrum is 180 KHz. In normal cyclic prefix (CP) mode for LTE downlink transmissions, seven (7) OFDM symbols are transmitted in a single time slot.

Figure 4:
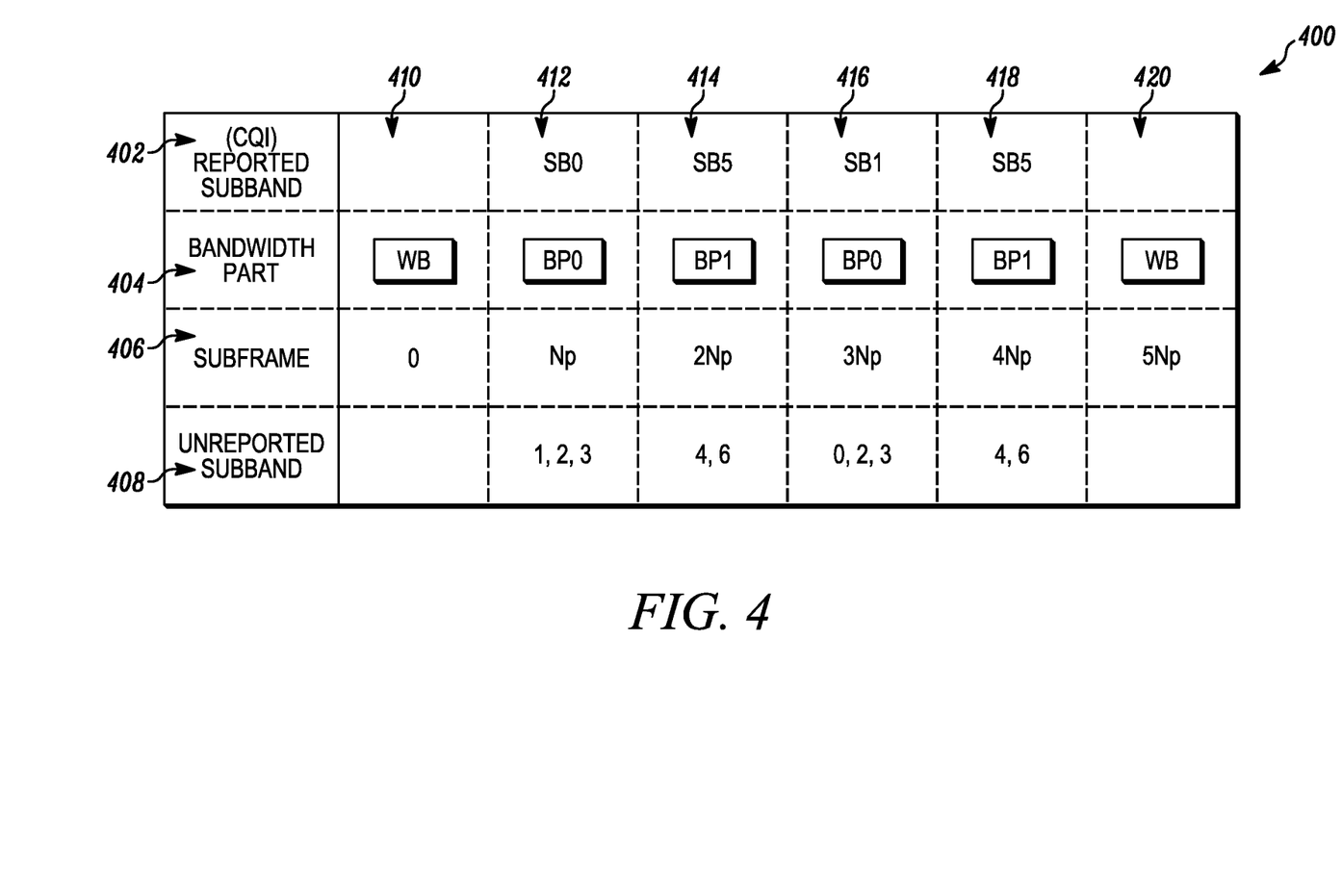
FIG. 4 is a table illustrating physical uplink control channel (PUCCH) subband reporting, according to one embodiment.

FIG. 4 is a table illustrating PUCCH subband based periodic CQI reporting, according to one embodiment. Table 400 is a table of four rows and seven columns. First row 402 identifies (within respective column) the subband corresponding to the reported subband CQI value for each of a sequence of reporting sub-frames. Second row 404 identifies the bandwidth part corresponding to the reported subband CQI values. Third row 406 identifies the reporting sub-frame, according to reporting interval "Np", to which the reported subband CQI values correspond. The fourth row 408 lists the subbands that are not reported at each corresponding reporting subframe.

The columns divide the identified entries for the rows described above, according to the respective sub-frame. For example, first column 410 provides respective entries corresponding to a first subframe, which subframe is indexed by the starting/initial time interval of "0". Second column 412 identifies entries corresponding to a second subframe indexed by a time interval "Np". Similarly illustrated within Table 400 are third column 414, fourth column 416, fifth column 418 and sixth column 420.

In PUCCH subband reporting, enodeB 106 configures the UE 102 to send periodic CQI reports to eNodeB 106. In one embodiment, enodeB 106 forwards information signals to configure one or more wireless devices that enables the one or more wireless devices to report: (a) a best subband CQI value for subbands within a corresponding bandwidth part at reporting periods designated for providing subband reports; and (b) a wideband CQI value for a downlink transmission bandwidth at reporting periods designated for providing the wideband CQI reports.

Subsequently, enodeB 106 receives: (a) the subband CQI report containing a best subband CQI value during a first reporting period; and (b) the wideband CQI report containing a wideband CQI value during a second reporting period. For example, UE sends a CQI report according to a reporting period Np. In particular, UE provides a series of subband CQI reports followed by a wideband CQI report. In every CQI reporting subframe, UE computes and reports the CQI value and corresponding subband index of the best subband within the bandwidth part for which the CQI report is due. In subband CQI reporting, the total number of subbands "N" is divided into J fractions called bandwidth parts. The value of J depends upon the system bandwidth. Therefore, if J represents the number of bandwidth parts and K represents a preconfigured value for the number of CQI reports for each of J bandwidth parts that is reported, the period of the wideband CQI report is (J*K+1)*Np. In one embodiment, the wideband report is based upon an average CQI value across the frequency band of received reference signals.

Table 400 shows that within the first reporting subframe, a first wideband CQI value/report "WB" is provided (i.e., the entry of second row 404 and first column 410). According to the second column 412, a subband CQI value "SB0" is reported within the second reporting subframe (i.e., subframe index "Np"). The corresponding bandwidth part is identified as "BP0". Since only one subband is reported, table 400 indicates that the other three subbands (i.e., subband 1 ("SB1"), subband 2 ("SB2") and subband 3 ("SB3")) are not reported during the second reporting subframe. As illustrated in the sixth column 420, a second wideband CQI value/report "WB" is provided at the sixth reporting subframe (i.e., at interval 5 Np).

As described in FIG. 3B, subbands comprise a particular number of PRBs. Furthermore, PRBs divide the total set of subbands, except the last subband. Each of these subbands that comprise PRBs has a fixed size. Since CQI reports are provided only at subband granularity, the CQI value of the PRBs within a subband is assumed to be the same and equal to that of the subband CQI value. In the wideband scheduler, the CQI value of all the subbands/PRBs within the downlink bandwidth are used to evaluate/determine the wideband CQI value/report. In one embodiment, the UE provides the wideband CQI report based on an average subband CQI value across the frequency band of received reference signals.

Table 400 particularly illustrates physical uplink control channel (PUCCH) subband reporting for a LTE system with a downlink transmission bandwidth of 5 MHz. The downlink transmission bandwidth is distributed among two bandwidth parts (i.e., BP0 and BP1). A first bandwidth part "BP0" comprises four (4) subbands and the second bandwidth part "BP1" comprises three (3) subbands. Thus, the total downlink transmission bandwidth is divided among seven (7) subbands. Each subband comprises four (4) PRBS (i.e., subband size 4).

As a further example (not explicitly shown via Table 400), a LTE system may be configured with a downlink transmission bandwidth of 10 MHz. In this configuration, the downlink transmission bandwidth is divided into three bandwidth parts. Each bandwidth part comprises three subbands each of which comprises 6 PRBs (i.e., subband size 6). Thus, there is a total of nine (9) subbands, with each subband comprising six (6) PRBs. According to LTE, this configuration with a downlink bandwidth of 10 MHz provides a total of 9 subbands comprising a total of 54 PRBs.

In Table 400, subband CQI values for subbands 2, 3, 4, 6 are not reported within a duration/interval of 5*Np. Further, there is no guarantee that these subbands are reported in the next 5*Np interval. As a result of a CQI reporting mechanism by which CQI values of the best subbands are reported, each subband does not report a subband CQI report at each reporting sub-frame. Furthermore, a subband CQI report for one or more subbands may not be reported for several consecutive reporting sub-frames. Thus, it is possible that subband CQI values stored at the scheduler are "old"/"stale".

As a result, SC utility 120 utilizes a subframe report period for a respective subband CQI report to calculate the age of the subband report. SC utility 120 determines whether the subband CQI report remains valid (i.e., whether the report age exceeds the threshold age). If the subband report is invalid, SC utility 120 utilizes the wideband CQI report/value, "wideband cqi(i)" instead of the subband CQI value for (current) transmission scheduling. However, if the subband report is valid, SC utility 120 utilizes (a) the subband CQI report for transmission scheduling when the report was received at the most recent reporting subframe or (b) a modified subband CQI value with a correction that utilizes the wideband CQI report, if the report was not received at the most current reporting subframe. SC utility 120 performs the filter based correction with an infinite impulse response (IIR) filter, that has a first term and a second term, wherein the first term is a first product of a particular subband CQI value and a first coefficient, and the second term is a second product of a last reported wideband CQI value and a second coefficient. The particular subband CQI value is one of: (a) an unexpired and previously reported subband CQI value; and (b) a computed subband CQI value, which was computed utilizing the filter based correction. In particular, the modified subband CQI value with a correction is obtained via an infinite impulse response (IIR) filter, expressed as follows:

$$c_n(i,j) = (1-a)*c_{n-1}(i,j) + a*\text{wideband\_cqi}(i)$$

where "a" represents a filter parameter/coefficient and "n" represents a reporting time index.

In one embodiment, FSS 124 is a proportional scheduler. However, in another embodiment, FSS 124 represents another (i.e., any other) type of scheduler, which other type of scheduler is a different type of scheduler from a proportional scheduler. In response to determining the appropriate/relevant type of CQI value when using the proportional scheduler, SC utility 120/FSS 124 calculates a CQI based metric "m" for each UE-PRB pair via the following expression:

$$m(i,j) = c(i,j)/R_{av}(i)$$

where c (i,j) is obtained for UE i on PRB j via one of: (a) the CQI reported by UE i on PRB j; (b) the wideband CQI value; and (c) the modified subband CQI value based on the IIR filter correction. $R_{av}(i)$ is average throughput achieved by UE i. However, since CQI reports are provided only at subband granularity, the CQI value of the PRBs within a subband is assumed to be the same and equal to that of the subband CQI value.

FSS 124 finds the UE-PRB pair represented by ($i_{select}$, $j_{select}$) for which the corresponding CQI based metric represented by $m(i_{select}, j_{select})$ is greater than any other candidate CQI based metric "m(i, j)". Thus, selection of the best UE-PRB pair accords with the following expression:

$$(i_{select}, j_{select}) | m(iselect, jselect) > m(i,j) \; \forall \; i,j$$

where "|" represents "given the condition" and $\forall$ i,j represents all eligible UE-PRB pairs. The selected PRB $j_{select}$ is disqualified for any assignment in the current subframe and the selected UE $i_{select}$ is not disqualified for more assignment in the current subframe provided the UE has data to send. Scheduler 124 finds/assigns best UE-PRB pairs until either all the PRBs are assigned or all the UEs have received the specified resource allotment.

Figure 5:
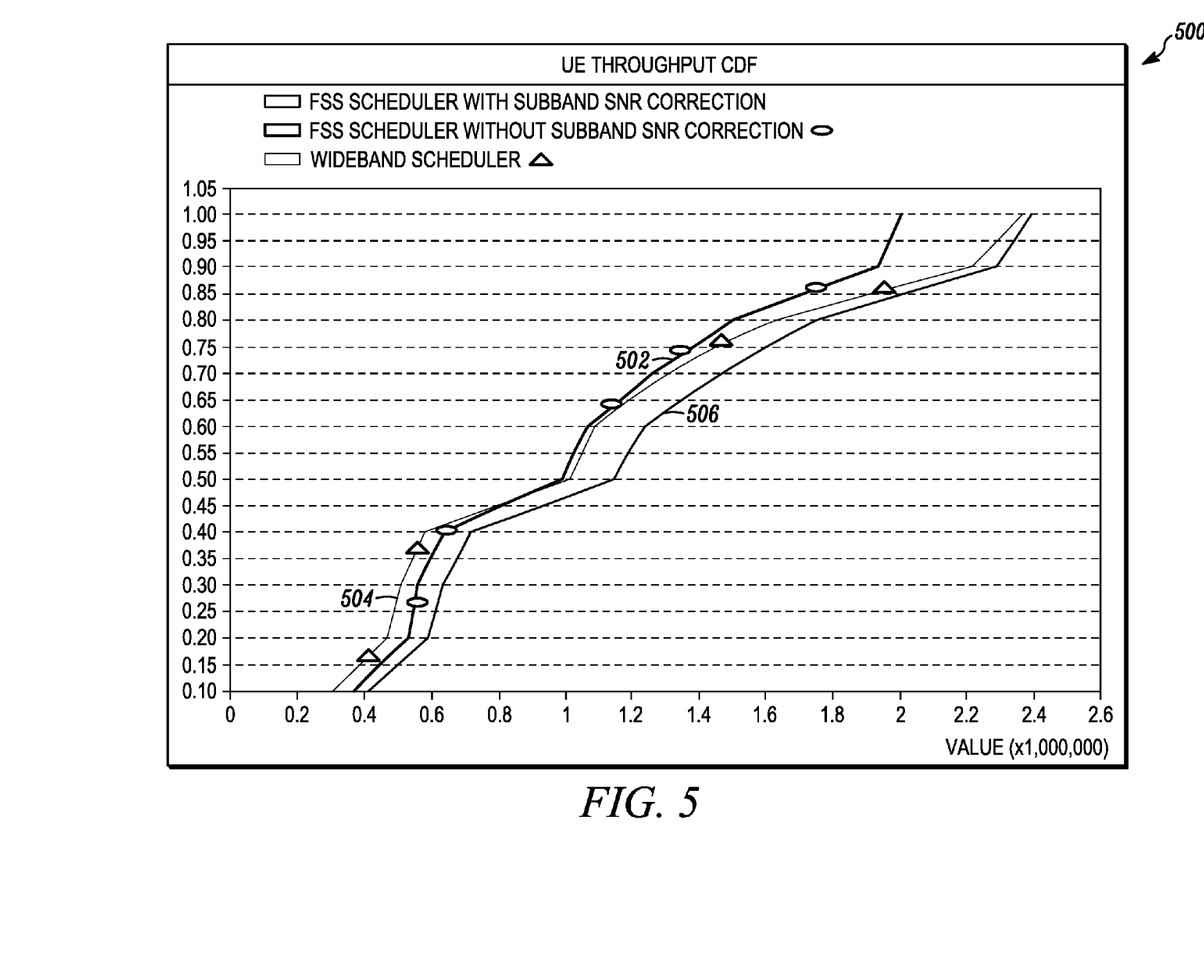
FIG. 5 illustrates three plots which comparatively demonstrate the impact of subband signal to noise ratio (SNR) modification, according to one embodiment.

FIG. 5 illustrates three plots which comparatively demonstrate the impact of subband SNR modification, according to one embodiment. Plots 500 comprise first plot 502 which shows the user throughput cumulative distribution function (CDF) for a frequency selective scheduler (FSS) that does not utilize subband SNR correction. Plots 500 also comprise second plot 504 which shows the user throughput CDF for a frequency selective scheduler (FSS) that operates as a wideband scheduler. In addition, plots 500 comprise third plot 506 which shows the user throughput CDF for a frequency selective scheduler (FSS) that utilizes subband SNR correction.

Plots 500 represent the results of an LTE Opnet system simulator. The simulation is configured with a 10 MHz downlink system bandwidth. The LTE simulated system is configured for full buffer traffic. The system comprises 10 mobiles/UEs, collectively moving with an average speed of 3 kmph. The frequency of CQI reporting is configured for 5 ms. According to first plot 502, wireless communication system 100 achieves an average UE throughput of 1.08 Mbps for an FSS that does not employ subband SNR modification/correction. According to third plot 506, wireless communication system 100 achieves an average UE throughput of 1.26 Mbps for an FSS that employs subband SNR modification/correction. By utilizing subband SNR modification/correction, wireless communication system 100 achieves a 16% improvement in average UE throughput. In addition, sector throughput improves from 11 Mbps to 12.6 Mbps (i.e., a 14.5% improvement in throughput).

Figure 6:
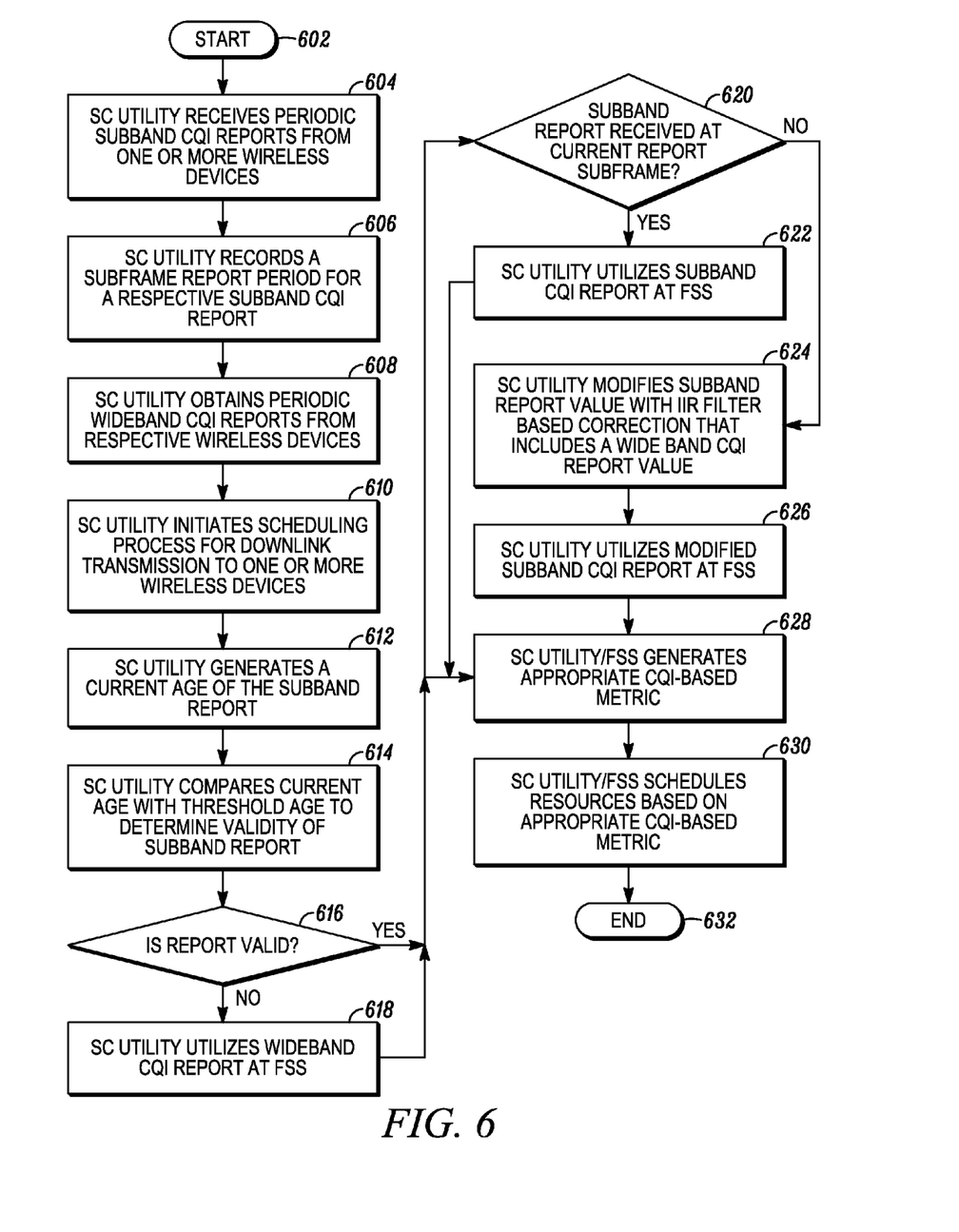
FIG. 6 is a flow chart which illustrates the process of selecting a particular channel quality indicator (CQI) report and applying a infinite impulse response (IIR) filter based correction to subband values in a frequency selective scheduler, according to one embodiment.

FIG. 6 is a flow chart which illustrates the process of executing a subband signal to noise ratio (SNR) correction in a frequency selective scheduler, according to one embodiment. Although the method illustrated in FIG. 6 may be described with reference to components shown in FIG. 1, it should be understood that this is merely for convenience and alternative components and/or configurations thereof can be employed when implementing the method. Key portions of the method may be completed by Scheduling Correction (SC) utility 120 executing within BS/eNodeB 106 (FIG. 1) and controlling specific operations of/on BS/eNodeB 106, and the method is thus described from the perspective of either/both SC utility 120 and BS/eNodeB 106.

The method begins at initiator block 602 and proceeds to block 604, at which, SC utility 120 receives periodic subband CQI reports from one or more wireless devices. SC utility 120 records a subframe report period for a respective subband CQI report, as shown at block 606. At block 608, SC utility 120 obtains periodic wideband CQI reports from respective wireless devices. At block 610, SC utility 120 initiates scheduling process for downlink transmission to one or more wireless devices. SC utility 120 generates a current age of the subband report based on the subframe report period for the subband CQI report and the period of the most current report subframe, as shown at block 612. At block 614, SC utility 120 compares the current age of the subband CQI report with a threshold age to determine the validity of the subband CQI report.

SC utility 120 determines whether the subband CQI report is still valid, as shown at decision block 616. If at decision block 616 SC utility 120 determines that the subband CQI report is no longer valid (i.e., the subband CQI value/report is too old), SC utility 120 utilizes a wideband CQI report at FSS 124 to make resource allocation/scheduling decisions, as shown at block 618. If at decision block 616 SC utility 120 determines that the subband report is still valid, SC utility 120 then determines whether the subband CQI report is received at the most current report subframe, as shown at decision block 620. If at block 620, SC utility 120 determines that the subband CQI report is received at the most current report subframe, the process proceeds to block 622 at which SC utility 120 utilizes the subband CQI report at FSS 124 to make resource allocation/scheduling decisions. If, at block 620, SC utility 120 determines that the subband report is not received at the most current report subframe, the process proceeds to block 624, at which SC utility 120 modifies the subband CQI report value with an IIR filter based correction that includes the wideband CQI report value. At block 626, SC utility 120 utilizes the modified subband CQI report at FSS 124 to make resource allocation/scheduling decisions. At block 628, SC utility 120/FSS 124 generates an appropriate CQI-based metric. In one embodiment, following a determination of the appropriate/relevant type of CQI value, SC utility 120/FSS 124 calculates a CQI based metric "m" for each UE-PRB pair.

SC utility 120/FSS 124 schedules resources based on the appropriate CQI-based metric, as shown at block 630. In one embodiment, FSS 124 finds the UE-PRB pair for which the corresponding CQI based metric is greater than any other candidate CQI based metric. Scheduler 124 finds/assigns best UE-PRB pairs until either all the PRBs are assigned or all the UEs have received the specified resource allotment. By utilizing the subband CQI value correction instead of an old subband CQI value, SC utility 120 significantly improves wireless device throughput. The process ends at block 632.

In the flow chart above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

The illustrated and described embodiments provide, in a base station, a mechanism and system that provides subband signal to noise ratio (SNR) correction in the scheduling of communication resources. The Scheduling Correction (SC) utility receives periodic subband and wideband channel quality indicator (CQI) reports from one or more wireless devices. The SC utility records a subframe report period for a respective subband CQI report. The SC utility calculates the age of the subband CQI report to determine whether the subband CQI report remains valid (i.e., whether the report age exceeds the threshold age). If the subband CQI report is invalid, the SC utility utilizes the wideband CQI report for (current) transmission scheduling. However, if the subband CQI report is valid, the SC utility utilizes (a) the subband CQI report for transmission scheduling from the most current reporting subframe or (b) a modified subband CQI value with a correction that utilizes the wideband CQI report, if the subband CQI report was not received at the most current reporting subframe.

According to the described embodiments, in a wireless communication system, SC utility 120/FSS 124 provides a method and a base-station for allocating communication resources to wireless devices. In particular, SC utility 120 provides the method/functionality for the following: receiving periodic subband channel quality indicator (CQI) reports and wideband CQI reports from one or more wireless devices; recording a subframe report period for a respective subband CQI report; initiating downlink transmission to one or more wireless devices; generating a current age of the subband report based on the elapsed time between the subframe report period recorded and the most current subframe period; comparing the current age with a threshold age to determine whether the corresponding report is valid; in response to a determination that the current age does not exceed the threshold age, scheduling downlink transmissions by using one of: (a) a subband CQI value from the most current reporting subframe; and (b) a computed subband CQI value which is based on a previous CQI value and a wideband CQI value; and in response to a determination that the current age exceeds the threshold age, utilizing the wideband CQI report for current downlink transmission scheduling.

In order to complete the method/functionality for scheduling downlink transmission, SC utility 120 determines whether the subband CQI report is reported during a most current CQI reporting subframe. In response to a determination that the subband CQI value is reported during the most recent CQI reporting subframe, SC utility 120 utilizes the subband CQI value for current transmission scheduling. In response to a determination that the subband CQI value is not reported during the most current CQI reporting subframe, SC utility 120 provides the method/functionality for the following: computing a subband CQI value which is based on a previous CQI value and a wideband CQI value via a filter based correction; and utilizing for current transmission scheduling the computed subband CQI value.

Additionally, SC utility 120 provides the method/functionality for the following: determining an average throughput achieved by a respective wireless device; obtaining a CQI based metric from the ratio of a subband CQI value and the average throughput for one or more of the following pair assignments: (a) a particular wireless device and a particular physical resource block (PRB); and (b) a particular wireless device and a particular subband; and identifying a best pair assignment among possible pair assignments based on the CQI based metric.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional base station with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
periodically receiving a subband channel quality indicator (CQI) report and a wideband CQI report from one or more wireless devices;
recording a subframe report period for the subband CQI report received;
dynamically determining which one of the subband CQI report and the wideband CQI report provides a best performance for scheduling a current downlink transmission; wherein the dynamically determining further comprises:
determining a current age of the subband report based on an elapsed time between the subframe report period recorded and a most current subframe reporting period;
comparing the current age with a threshold age to determine whether a corresponding report is valid;
in response to a determination that the current age does not exceed the threshold age, scheduling the current downlink transmission by using one of: (a) a subband CQI value from the most current reporting subframe; and (b) a computed subband CQI value which is based on a previous CQI value and a wideband CQI value; and
in response to a determination that the current age exceeds the threshold age, scheduling the current downlink transmission utilizing the wideband CQI report.

2. The method of claim 1, further comprising:
performing the filter based correction with an infinite impulse response (IIR) filter, that has a first term and a second term, wherein the first term is a first product of a particular subband CQI value and a first coefficient, and wherein the second term is a second product of a last reported wideband CQI value and a second coefficient; and
wherein the particular subband CQI value is one of: (a) an unexpired and previously reported subband CQI value; and (b) a computed subband CQI value, which was computed utilizing the filter based correction.

3. The method of claim 1, wherein the scheduling further comprises:
determining whether the subband CQI report is reported during a most current CQI reporting subframe;
in response to a determination that the subband CQI value is reported during the most current CQI reporting subframe, performing the scheduling of the current downlink transmission utilizing the subband CQI value.

4. The method of claim 3, further comprising:
in response to a determination that the subband CQI value is not reported during the most current CQI reporting subframe:
computing a subband CQI value which is based on a previous CQI value and a wideband CQI value via a filter based correction; and
scheduling current downlink transmission utilizing the computed subband CQI value.

5. The method of claim 1, wherein the receiving further comprises:
forwarding information signals to configure one or more wireless devices that enables the one or more wireless devices to report:
a best subband CQI value for subbands within a corresponding bandwidth part at reporting periods designated for providing subband reports; and
a wideband CQI value for a downlink transmission bandwidth at reporting periods designated for providing the wideband reports;
receiving the subband CQI report containing a best subband CQI value during a first reporting period; and
obtaining the wideband CQI report containing a wideband CQI value during a second reporting period.

6. The method of claim 1, further comprising:
determining an average throughput achieved by a wireless device;
obtaining a CQI based metric from a ratio of a subband CQI value and the average throughput for the wireless device;
identifying a best pair assignment of the wireless device and a selected physical resource block (PRB) based on the CQI based metric;
allocating one or more corresponding PRBs to an identified wireless device, based on the best pair assignment.

7. The method of claim 6, wherein:
the wireless communication system comprises a plurality of wireless devices;
the allocating is performed in response to required subband resources being available to enable execution of control channel functions; and
the allocating continues until one or more conditions occur from among: (a) the PRBs are all allotted; and (b) all of the plurality of wireless devices have been appropriately assigned PRBs.

8. A base station comprising:
a processor;
a memory having stored therein a scheduler;
a utility which when executed by the processor performs the functions of:
periodically receiving a subband channel quality indicator (CQI) report and a wideband CQI report from one or more wireless devices;
recording a subframe report period for the subband CQI report received;
dynamically determining which one of the subband CQI report and the wideband CQI report provides a best performance for scheduling a current downlink transmission; wherein the functions for dynamically determining further comprises:
determining a current age of the subband report based on an elapsed time between the subframe report period recorded and a most current subframe reporting period;
comparing the current age with a threshold age to determine whether a corresponding report is valid;
in response to a determination that the current age does not exceed the threshold age, scheduling the current downlink transmission by using one of: (a) a subband CQI value from the most current reporting subframe; and (b) a computed subband CQI value which is based on a previous CQI value and a wideband CQI value; and
in response to a determination that the current age exceeds the threshold age, scheduling the current downlink transmission utilizing the wideband CQI report.

9. The base station of claim 8, wherein the utility further performs the following functions:
performing the filter based correction with an infinite impulse response (IIR) filter, that has a first term and a second term, wherein the first term is a first product of a particular subband CQI value and a first coefficient, and wherein the second term is a second product of a last reported wideband CQI value and a second coefficient; and
wherein the particular subband CQI value is one of: (a) an unexpired and previously reported subband CQI value; and (b) a computed subband CQI value, which was computed utilizing the filter based correction.

10. The base station of claim 8, wherein the functions for scheduling further comprises functions for:
determining whether the subband CQI report is reported during a most current CQI reporting subframe;
in response to a determination that the subband CQI value is reported during the most current CQI reporting subframe, performing the scheduling of the current downlink transmission utilizing the subband CQI value.

11. The base station of claim 10, wherein the functions for scheduling further comprises functions for:
in response to a determination that the subband CQI value is not reported during the most current CQI reporting subframe:
computing a subband CQI value which is based on a previous CQI value and a wideband CQI value via a filter based correction; and
scheduling current downlink transmission utilizing the computed subband CQI value.

12. The base station of claim 8, wherein the functions for receiving further comprises functions for:
forwarding information signals to configure one or more wireless devices that enables the one or more wireless devices to report:
a best subband CQI value for subbands within a corresponding bandwidth part at reporting periods designated for providing subband reports; and
a wideband CQI value for a downlink transmission bandwidth at reporting periods designated for providing the wideband reports;
receiving the subband CQI report containing a best subband CQI value during a first reporting period; and
obtaining the wideband CQI report containing a wideband CQI value during a second reporting period.

13. The base station of claim 8, further comprising functions for:
determining an average throughput achieved by a wireless device;
obtaining a CQI based metric from a ratio of a subband CQI value and the average throughput for the wireless device;
identifying a best pair assignment of the wireless device and a selected physical resource block (PRB) based on the CQI based metric;
allocating one or more corresponding PRBs to an identified wireless device, based on the best pair assignment.

14. The base station of claim 13, wherein:
the wireless communication system comprises a plurality of wireless devices;

the allocating is performed in response to required subband resources being available to enable execution of control channel functions; and the allocating continues until one or more conditions occur from among: (a) the PRBs are all allotted; and (b) all of the plurality of wireless devices have been appropriately assigned PRBs.

* * * * *